United States Patent
Pradas et al.

(10) Patent No.: US 10,165,511 B2
(45) Date of Patent: Dec. 25, 2018

(54) METHOD AND COMMUNICATION DEVICE FOR ESTABLISHING A DISCONTINUOUS RECEPTION MODE CONFIGURATION

(71) Applicant: Telefonaktiebolaget L M Ericsson (publ), Stockholm (SE)

(72) Inventors: Jose Luis Pradas, Stockholm (SE); Torgny Palenius, Barsebäck (SE); Johan Rune, Lidingö (SE); Icaro Leonardo J. Da Silva, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 278 days.

(21) Appl. No.: 14/899,070

(22) PCT Filed: Nov. 23, 2015

(86) PCT No.: PCT/SE2015/051257
§ 371 (c)(1),
(2) Date: Dec. 16, 2015

(87) PCT Pub. No.: WO2017/091114
PCT Pub. Date: Jun. 1, 2017

(65) Prior Publication Data
US 2018/0035372 A1 Feb. 1, 2018

(51) Int. Cl.
*H04W 52/02* (2009.01)
*H04W 76/28* (2018.01)
*H04W 76/27* (2018.01)
*H04W 72/12* (2009.01)

(52) U.S. Cl.
CPC ....... *H04W 52/0216* (2013.01); *H04W 76/28* (2018.02); *H04W 72/1263* (2013.01); *H04W 76/27* (2018.02); *Y02D 70/1262* (2018.01); *Y02D 70/164* (2018.01); *Y02D 70/24* (2018.01)

(58) Field of Classification Search
CPC ..... H04W 48/16; H04W 48/12; H04W 24/08; H04W 76/048
See application file for complete search history.

(56) References Cited

U.S. PATENT DOCUMENTS

| | | | | |
|---|---|---|---|---|
| 2012/0170497 | A1* | 7/2012 | Zhang | H04W 76/048 370/311 |
| 2012/0195240 | A1* | 8/2012 | Kim | H04W 52/0216 370/311 |
| 2013/0294313 | A1* | 11/2013 | Han | H04W 52/0216 370/311 |

(Continued)

OTHER PUBLICATIONS

International Search Report and Written Opinion for International Patent Application No. PCT/SE2015/051257, dated Aug. 9, 2016, 11 pages.

*Primary Examiner* — Chi Ho A Lee
(74) *Attorney, Agent, or Firm* — Withrow & Terranova, PLLC

(57) ABSTRACT

A method is provided, which may be performed in a communication device for establishing a discontinuous reception mode configuration. The method comprises determining at least one characteristics of signaling from a network node, and adapting, based on the at least one characteristics, at least one parameter of a currently used discontinuous reception mode configuration. A related communication device, computer program and computer program products are also provided.

20 Claims, 8 Drawing Sheets

(56) References Cited

U.S. PATENT DOCUMENTS

| | | | |
|---|---|---|---|
| 2014/0038579 A1* | 2/2014 | Henttonen | H04W 8/22 455/418 |
| 2014/0095675 A1 | 4/2014 | Tomala et al. | |
| 2015/0009898 A1* | 1/2015 | Rosa | H04L 5/0048 370/328 |
| 2015/0173039 A1 | 6/2015 | Rune et al. | |
| 2015/0223149 A1* | 8/2015 | Liu | H04W 48/12 370/252 |
| 2015/0327325 A1* | 11/2015 | Koivisto | H04L 5/005 370/350 |
| 2016/0029309 A1* | 1/2016 | Kim | H04W 52/0258 370/311 |
| 2016/0212642 A1* | 7/2016 | Ljung | H04W 24/08 |
| 2016/0242162 A1* | 8/2016 | Yao | H04W 24/00 |
| 2016/0262100 A1* | 9/2016 | Larsson | H04W 48/16 |
| 2017/0202052 A1* | 7/2017 | Xu | H04W 76/048 |

* cited by examiner

METHOD AND COMMUNICATION DEVICE FOR ESTABLISHING A DISCONTINUOUS RECEPTION MODE CONFIGURATION

This application is a 35 U.S.C. § 371 national phase filing of International Application No. PCT/SE2015/051257, filed Nov. 23, 2015, the disclosure of which is incorporated herein by reference in its entirety.

TECHNICAL FIELD

The technology disclosed herein relates generally to the field of wireless communication, and in particular to a method, a communication device and related computer program and computer program product for establishing a discontinuous reception mode configuration.

BACKGROUND

Energy-efficiency in wireless communications networks, e.g. a Long Term Evolution (LTE) network, is important for many reasons. The energy consumption is a major operating cost for network operators and therefore energy-saving features are of high interest. Operators' energy operating expenses (OPEX) are expected to continue to increase and the energy performance of network nodes such as evolved NodeBs (eNodeBs) as well as other entities of the network may be a sales advantage.

Some results from energy consumption studies in mobile networks have shown that a non-negligible part of the network operator's energy consumption in their wireless networks comes from physical layer processing and transmission. This can be justified in scenarios where there is always traffic in a given area. However, due to the LTE design there is a high and almost constant energy consumption even when there is not traffic in a given cell.

FIG. 1 shows the energy consumption for one LTE network in Europe for the following scenarios:

Scenario 1: "the most relevant traffic scenario for 2015"
Scenario 2: "an upper bound on the anticipated traffic for 2015"
Scenario 3: "an extremity for very high data usage in future networks"

The left-hand side diagram of FIG. 1 shows ratio of empty subframes for the different scenarios. When there is no traffic, the ratio is 100%, but the ratio of empty subframes is high or very high also for the above scenarios (95%, 90% and 81%, respectively). The right-hand side diagram of FIG. 1 illustrates the energy consumption (area power) for the above scenarios. There is a fixed energy consumption and a dynamic energy consumption depending on the amount of traffic. As can be seen from the results shown in FIG. 1, there is a high consumption even for a cell with little traffic. A large part of the energy comes from the fixed energy consumption, for instance comprising constantly transmitted cell specific reference signals (CRSs), broadcasted over the whole bandwidth. The way system information (SI) is acquired in LTE represents a non-negligible amount of signals constantly broadcasted over the air interface.

Before a communication device, in the following denoted user equipment (UE), can access a wireless communications network, it has to acquire the system information. This is done in different ways depending on whether the UE is roaming, recovering from radio link failure (RLF) or powering on. However, some general steps are typically similar. At the network side, a certain amount of information is broadcast in each cell. The first information is a primary synchronization signal (PSS) and a secondary synchronization signal (SSS), which are used by the UE to obtain frequency and time (symbol and frame) synchronization. These signals also encode the physical cell identity (PCI). After this physical layer synchronization and PCI detection the UE is capable of performing channel estimation by using cell specific reference signals (CRSs), which are constantly broadcasted, and finally decode the system information in a few steps.

From the physical layer point of view, PSS/SSS and CRSs are always broadcasted by the network. These are used by the UE for synchronization and for being able to perform channel estimation.

System information in LTE is structured by means of System Information Blocks (SIBs), each of which comprises a set of functionally-related parameters. The SIB types that have been defined include:

Master Information Block (MIB) comprises a limited number of the most frequently transmitted parameters which are essential for a UE's initial access to the network.

System Information Block Type 1 (SIB1) comprises parameters needed to determine if a cell is suitable for cell selection, as well as information about the time-domain scheduling of other SIBs.

System Information Block Type 2 (SIB2) comprises common and shared channel information.

SIB3, SIB4, SIB5, SIB6, SIB7, SIB8 comprise parameters used to control intra-frequency, inter-frequency and inter-RAT cell reselection.

SIB9 is used to signal the name of a Home evolved NodeB (HeNB), HeNB being a LTE specific term denoting a low-power smart cell.

SIB10, SIB 11, SIB12 comprises the Earthquake and Tsunami Warning Service (ETWS) notifications and Commercial Mobile Alert System (CMAS) warning messages.

SIB13 comprises Multimedia Broadcast Multicast Services (MBMS) related control information.

SIB14 is used to configure Extended Access Class Barring.

SIB15 is used for convey MBMS mobility related information.

SIB16 is used to convey Global Positioning System (GPS)-related information.

This list of System Information Block Types has been expanding over the years and it is expected to continue to increase during next-coming Third Generation Partnership Project (3GPP) releases.

3GPP defines as "essential information", the information contained in MIB, SIB Type 1, and SIB Type 2. For UEs that are Extended Access Barring (EAB) capable, the information in SIB Type 14 is also considered to be essential information. "Essential information" means that the UE needs to acquire the information prior to accessing the network.

The system information is constantly broadcasted, but depending on the type of information, different periodicities are assumed. In LTE the time-domain scheduling of the MIB and SIB1 messages is fixed with periodicities of 40 ms and 80 ms. Furthermore, for the MIB the transmission is repeated four times during each period, i.e. once every 10 ms. SIB1 is also repeated four times within its 80 ms period, i.e. every 20 ms, but with different redundancy version for each transmission.

The time-domain scheduling of the SI messages (for the other SIBs) is dynamically flexible: each SI message is transmitted in a defined periodically-occurring time-domain window, while physical layer control signaling indicates in which subframes within this window the SI is actually scheduled. The scheduling windows of the different SI messages (referred to as SI-windows) are consecutive, i.e. there are neither overlaps nor gaps between them, and they have a common length that is configurable. SI-windows can include subframes in which it is not possible to transmit SI messages, such as subframes used for SIB1 and subframes used for the uplink in Time division duplex (TDD).

FIG. 2 illustrates an example, for the case of LTE, of the time-domain scheduling of SI, showing the subframes used to transfer the MIB (black squares in FIG. 2), SIB1 (indicated by crosses) and four SI messages. The example uses an SI window of length 10 subframes, and four such SI windows are shown, numbered from 1 to 4. The first SI-window (SI-window 1) is a radio frame with System Frame Number (SFN)=0, and a MIB is included in the first subframe thereof, and in the second, fourth and seventh subframes other SI messages are included. In the sixth subframe SIB 1 is included. As can be seen, the SI may be scheduled differently within the different SI-windows.

Energy-saving features are important also for the communication device, e.g. user equipment (UE). One known feature for saving battery operation time is a Discontinuous Reception (DRX) functionality. In LTE, the DRX functionality can be configured for UEs in both the RRC_IDLE state (Radio Resource Control, RRC) and RRC_CONNECTED state.

For DRX in RRC_CONNECTED state a DRX cycle comprises an active ("on") part and a passive ("sleep"/"off") part. During the active part, i.e. the 'On Duration', the UE should monitor downlink channels such as Physical Downlink Control Channel (PDCCH), monitor downlink signals such as Primary Synchronization Signal/Secondary Synchronization Signal (PSS/SSS) and CRSs in order to perform measurements, and decode messages such as system information blocks.

During the sleep period, comprising the remainder of the DRX cycle, the UE is configured to skip the monitoring actions for battery saving purposes and can thus not be reached for downlink transmissions for the duration of this sleep period. The parameterization (e.g. length of the sleep period) of the DRX cycle involves a tradeoff between battery saving and latency. On the one hand, a long DRX period is beneficial for lengthening the UE's battery life. On the other hand, in the case of the UE being in RRC_IDLE state, long periods can delay UE responses to paging and for UEs in RRC_CONNECTED state a long DRX cycle may delay delivery of downlink data. The active period has a configured minimum length controlled by an on-duration timer of the UE, which can be dynamically extended if downlink activity occurs during the active period.

FIG. 3 shows an example of a DRX configuration for a UE in RRC_CONNECTED state. When a scheduling message is received during an 'On Duration' (active part), the UE starts a 'DRX Inactivity Timer' and monitors the downlink channels in every subframe while the DRX Inactivity Timer is running. During this period, the UE can be regarded as being in a continuous reception mode. Whenever a scheduling or paging message is received (indicated by "MAC CE reception" in the FIG. 3, for Media Access Control Control Element) while the DRX Inactivity Timer is running, the UE restarts the DRX Inactivity Timer, and when it expires the UE moves into a short DRX cycle and starts a 'DRX Short Cycle Timer'. The UE is free to send uplink data at any time during a DRX cycle, i.e. during the active part as well as during the passive part.

In LTE, DRX configuration for a UE in RRC_CONNECTED state is provided to the UE via dedicated RRC signaling. The network, e.g. an evolved NB (eNB) thereof, may also dynamically impact the UE's DRX behavior via Media Access Control (MAC) signaling.

When using DRX in RRC_IDLE state in LTE, a UE monitors the relevant paging occasions for paging messages intended for the UE, but can remain in a low-power sleep state between these paging occasions. The paging occasions that are applicable for a UE are derived by both the eNB and the UE from a combination of system information parameters and UE specific parameters. Further, the UE may also measure on signals in order to perform cell reselection.

The current solutions for system access in LTE attempts to reduce the time to access the system in all these different scenarios, e.g. when the UE has no prior information about the system, such as when powering on or roaming. A major drawback of such solutions is the high energy consumption or waste due to the constantly broadcasted reference signals and information, especially in the case where there are many cells without traffic during certain periods.

This unnecessary energy consumption and also potentially generated interference to UEs in other cells in these traffic scenarios comes from the fact that system access in LTE depends on broadcasted information over the air. The system access in LTE depends, for instance, on broadcasted information such as PSS/SSS for physical layer synchronization and PCI detection, the MIB, SIB1 and SIB2 (wherein about 1000 bits over the air within a repeated window of few hundred milliseconds) and CRSs at least within the bands of MIB, SIB1 and SIB2.

The time needed to access the system can be kept short for UEs and other devices that want to access the otherwise empty cell without having any prior information about the cell; however this is not an energy efficient solution.

SUMMARY

Energy efficiency is likely to be a rather important requirement in future access systems. As shown above, a considerable amount of energy is consumed by reference signals and system information in known systems such as LTE. There may be situation in which cells do not carry any traffic or do not have users. In particular, there would be a potential advantage if the network could adapt its reference signals and system information broadcast in order to minimize energy consumption during those periods.

In order to minimize the reference signals and system information, solutions with the following design principles could be implemented:
  Only broadcast the system information from some nodes
    in the network which have good coverage.
  Nodes transmitting system information may aggregate
    and transmit system information from different nodes
    in the system. The aggregated system information is
    referred to as Access Information Table—AIT.
  AIT may be transmitted frequently (e.g. every few dozens
    of milliseconds) up to infrequently (e.g. every few
    seconds).
  Each entry in the AIT contains essential information for
    future access systems similar to the essential information in LTE which is contained in MIB, SIB1 and SIB2.
  Each node may transmit a system signature index (SSI)
    which is associated to an entry in the AIT.

A SSI may comprise synchronization signals or synchronization signals and payload (with reference signals), and they may be transmitted with flexible periodicity.

A UE detecting the SSI and having a valid, stored AIT knows the essential system information for accessing that node.

SSI transmissions can be flexibly configured so that different periods (such as in the order of dozens to hundreds of milliseconds) can exist depending e.g. on the cell load or requirements for a quick system access.

The above described design principles aim at reducing the amount of broadcast signals and also adapting the periodicity of the signals to the network situation. This assumes that the UE, for most of the time, has access to the possible SSI transmission configurations from an internally stored copy of a previously received AIT and only use the broadcast indexes which can be called system signatures (i.e. SSIs) to point to the correct configuration for a given area.

FIG. 4 illustrates an example of the above, in particular signals broadcasted in the System Control Plane concept, wherein system and control plane functionality is decoupled from user-data in the radio interface. One or more AITs are broadcasted in a time-frequency (x- and y-axis, respectively) resource and repeated frequently or infrequently, as mentioned above. The nodes may transmit their SSI, as described above and exemplified in FIG. 4 by macro node SSI and small cell SSI. This approach focuses on minimizing network energy consumption, but may impact the access delay when the UEs have no prior information before accessing the system. In order to avoid such access delay the solution allows a flexible configuration of the SSI, AIT and their self-contained reference signals. In addition to that, other signals might be needed, for example to indicate some notions of location so the UEs can perform UE-based mobility and location updates or tracking area updates. These signals could also be flexibly configured.

In addition to this, in the case of signals transmitted as payload such as SSIs, the AITs can vary quite a lot in size i.e. covering a different amount of OFDM symbols per subframe. As a particular example, one AIT entry is roughly equivalent to the current MIB/SIB-1/SIB-2>200 bits, but the AIT could also contain all possible entries in a given area.

From the above it is clear that flexibility is desirably introduced in future access systems. Such flexibility may comprise the system being able to decide:
The amount of signals to be transmitted (e.g. SSI and/or AIT and/or location signals and/or synchronization signals and/or mobility reference signals, etc.);
The periods with which the signals are transmitted;
How much information should be transmitted i.e. how many resources particular signals will occupy;
Which nodes that should transmit and which should not.

These features might be beneficial, for instance, in order to address requirements at the network side in terms of energy efficiency or to enable different use cases to have differing access methods. On the other hand it may create problems to the existing DRX mechanism when the UE has no way to receive dedicated configurations. In sleeping mode the UE is supposed to receive a DRX configuration via system information blocks, but system information itself might be affected by this flexible period that may change from one area to another or over time within the same area.

Therefore, if a UE is configured with DRX cycles for an area with signals seldom transmitted and the area changes its configurations to signals transmitted more often the UE might not be able to benefit from this fact. The other way around is also conceivable, i.e. the UE is configured with DRX cycles for an area with signals that are transmitted often and the area changes its configurations to signals transmitted seldom so that the UE wakes up unnecessarily leading to a non-optimized DRX use. Similar cases may occur when the UE moves between areas with different configurations.

An objective of the present disclosure is to address the above mentioned problem. A way of meeting the desired to reduce signaling and hence power consumption in the network while still enabling communication devices to enter a lower power mode without missing essential information has been identified.

The objective is according to an aspect achieved by a method performed in a communication device for establishing a discontinuous reception mode configuration. The method comprises determining at least one characteristics of signaling from a network node and adapting, based on the at least one characteristics, at least one parameter of a currently used discontinuous reception mode configuration.

An advantage of the method is that a communication device is enabled to adapt its discontinuous reception cycle according to the network transmissions, and to thereby save as much battery operating time as possible, while keeping accessibility performance. Further, the network operator may continue developing features towards reduction of the amount of signaling from the network node without risking the communication devices to fail receiving important signaling.

The objective is according to an aspect achieved by a computer program for a communication device for establishing a discontinuous reception mode configuration. The computer program comprises computer program code, which, when executed on at least one processor on the communication device causes the communication device to perform the method as above.

The objective is according to an aspect achieved by a computer program product comprising a computer program as above and a computer readable means on which the computer program is stored.

The objective is according to an aspect achieved by a communication device for establishing a discontinuous reception mode configuration. The communication device is configured to: determine at least one characteristics of signaling from a network node and to adapt, based on the at least one characteristics, at least one parameter of a currently used discontinuous reception mode configuration.

The method enables the communication device to autonomously, i.e. without instructions from the network, adapt its discontinuous reception mode configuration according to current network signaling.

Further features and advantages of the embodiments of the present teachings will become clear upon reading the following description and the accompanying drawings.

DETAILED DESCRIPTION

Figure 1:
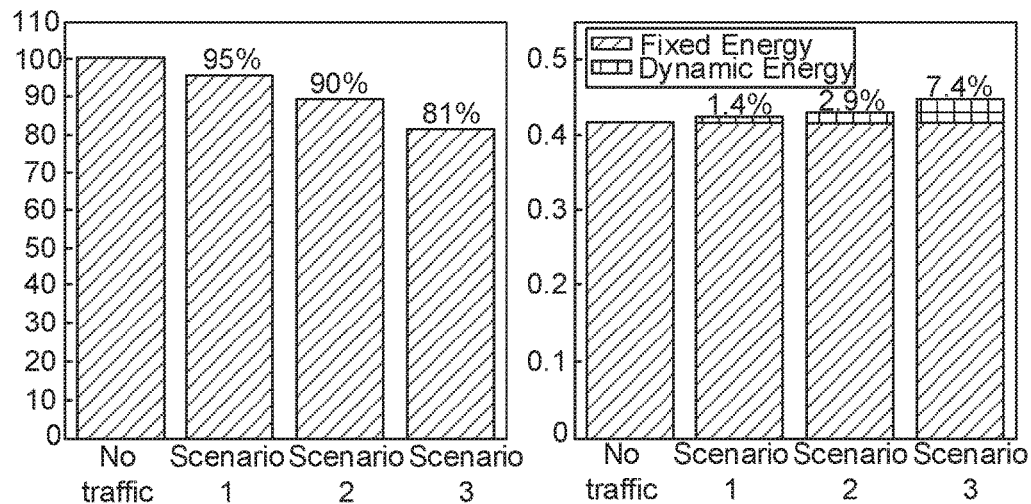
FIG. 1 illustrates graphically energy consumption for a typical LTE network.
Figure 2:
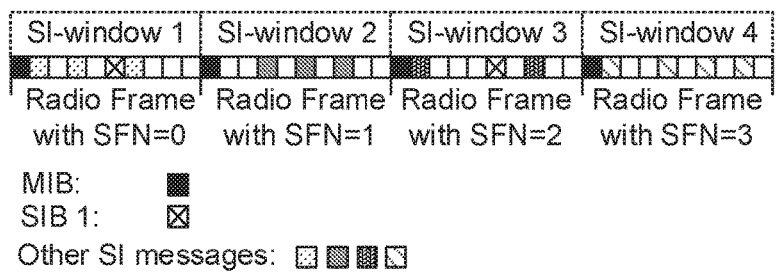
FIG. 2 illustrates time-domain scheduling of system information.
Figure 3:
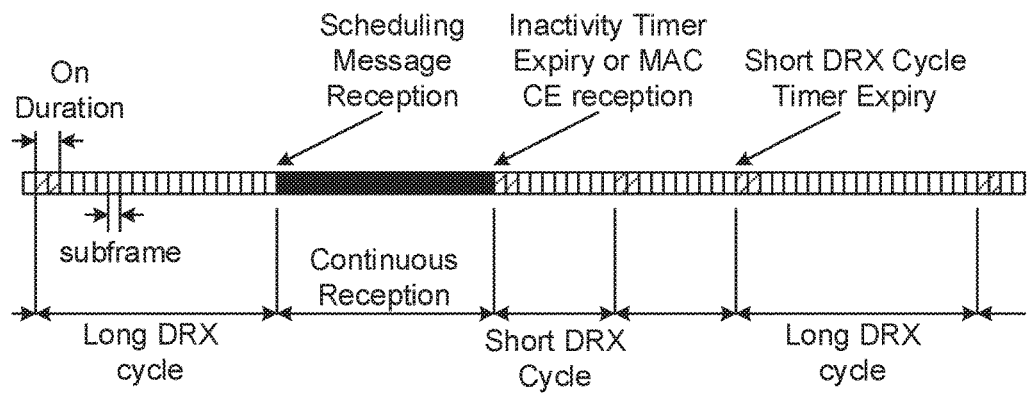
FIG. 3 illustrates an example of a DRX configuration.
Figure 4:
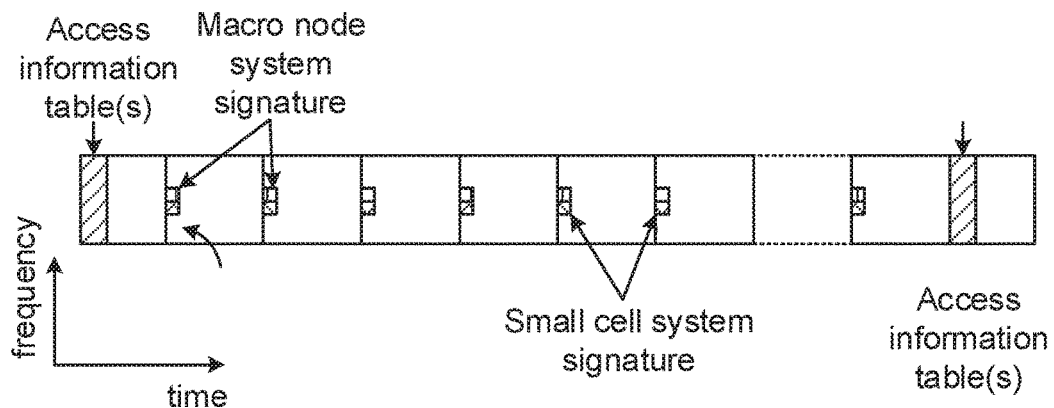
FIG. 4 illustrates signals broadcast in system control plane concept.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

For sake of completeness and in order to provide thorough understanding of the present teachings, description on some aspects in a wireless communications network is initially provided. LTE is in the following used for exemplifying a wireless communications network, but it is noted that the teachings are not restricted for use in LTE only. The present teachings are believed to be applicable to future access systems as well, for example fifth generation (5G) systems.

Figure 5:
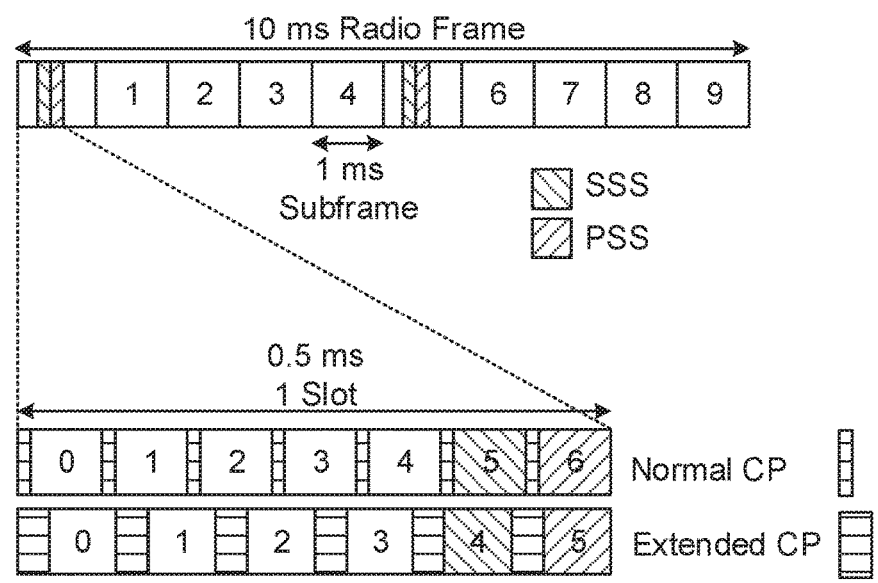
FIG. 5 illustrates frame and slot structure in time domain for synchronization signals.

FIG. 5 illustrates PSS and SSS frame and slot structure in time domain for the case of Frequency-division duplex (FDD). At the upper part of FIG. 5 a radio frame is illustrated, extending 10 ms in time and comprising 10 subframes. Each subframe comprises two equally sized slots (i.e. 0.5 ms), each slot in turn comprising seven or six orthogonal frequency-division multiplexing (OFDM) symbols. In case of extended cyclic prefix (CP), the slot comprises six OFDM symbols, while it comprises seven for normal CP. As illustrated, the PSS (lines inclined to the right) and SSS (lines inclined to the left), respectively, are transmitted in the first and sixth subframes within the radio frame, and within each of these subframes in the fifth and sixth OFDM symbols (for the case of extended CP) or sixth and seventh OFDM symbols (for the case of normal CP). The transmission can be scheduled by Resource Blocks (RB), each of which comprises a number of consecutive sub-carriers for the duration of one slot.

Figure 6:
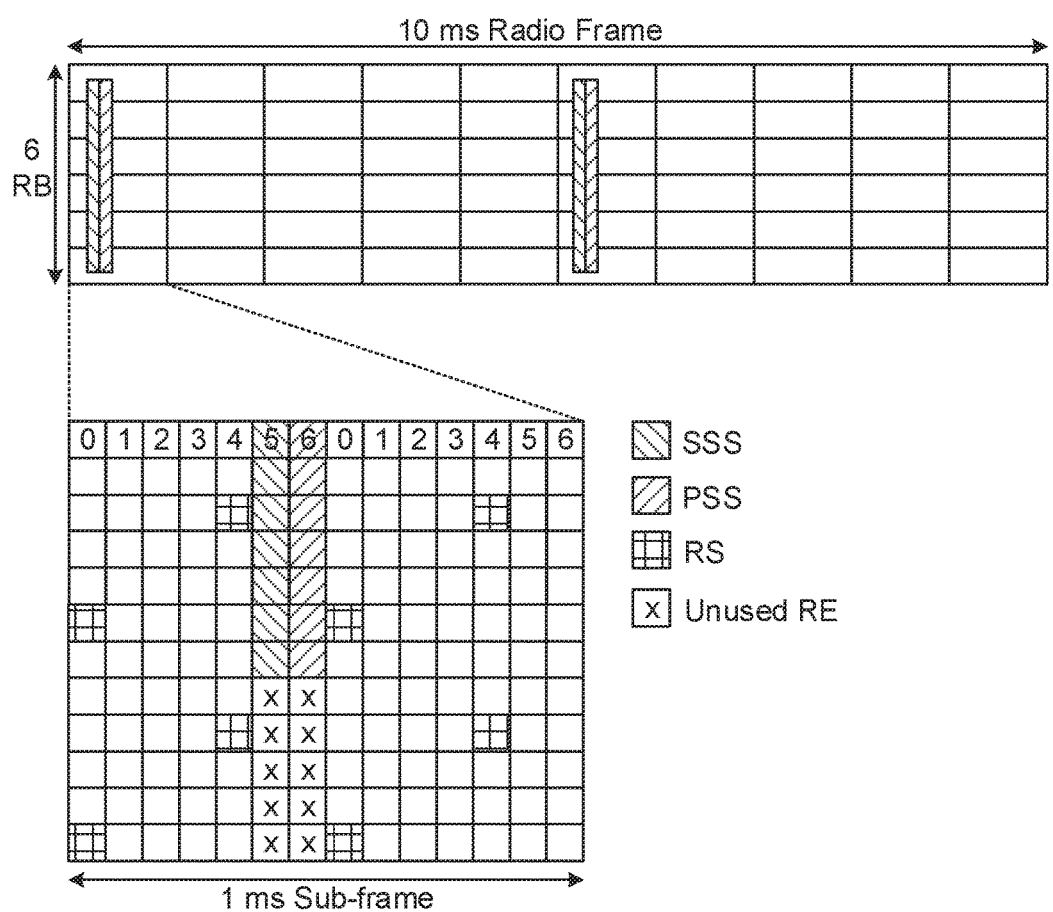
FIG. 6 illustrates broadcast signals from a physical layer point of view.

FIG. 6 illustrates broadcast signals from the physical layer point of view. In FIG. 6, a radio frame is again illustrated, now shown when divided into the resources blocks. Below the radio frame, one slot is shown in more detail. As can be seen, the PSS and SSS occupy the six central resource blocks, in particular in the central band for a given carrier frequency. FIG. 6 also illustrates the broadcasted CRSs, in the figure denoted RS (cross-hatched lines), and indicates unused resource elements (REs) by crosses.

Figure 7:
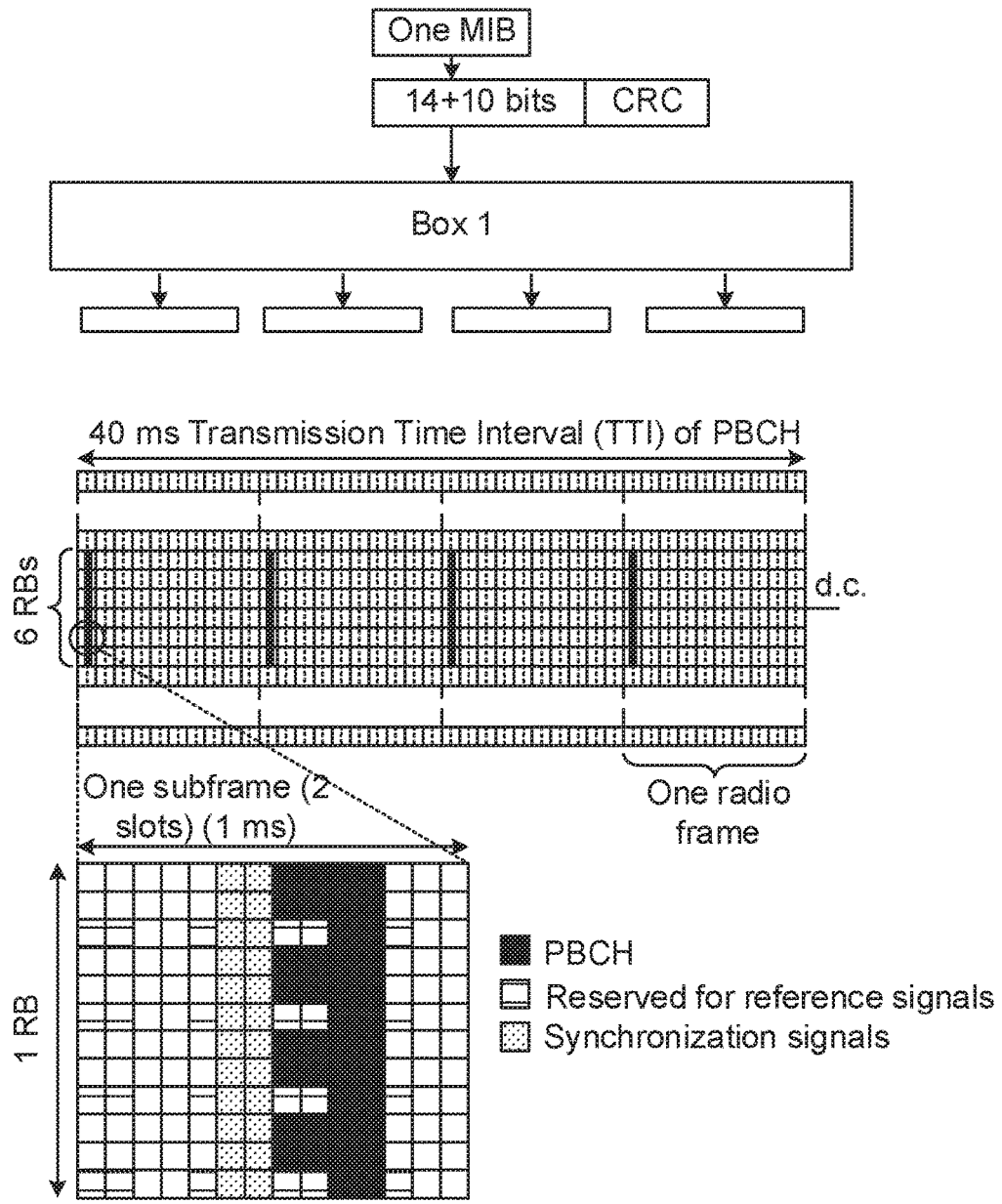
FIG. 7 illustrates a Physical Broadcast Channel structure.

FIG. 7 illustrates a Physical Broadcast Channel (PBCH) structure in LTE. The physical channel on which the SI information is transmitted differs from one SI block to another SI block. For example, the MIB is transmitted over the Physical Broadcast Channel (PBCH) as shown in FIG. 7, while the other SIBs are transmitted over the Physical Downlink Shared Channel (PDSCH) so they can be flexibly scheduled in other portions of the frequency band. Regarding the amount of information, the MIB contains 14 information bits with additional 10 spare bits for future use and a 16 bit Cyclic Redundancy Check (CRC) while SIB1 and SIB12 may contain up to 1000 bits, which makes them expand over more than 6 RBs. However, the latter may have a different coverage requirement, and thus lower repetition rate.

The MIB is coded and rate-matched (repeating or puncturing bits to generate a desired code rate) (Box 1 of FIG. 7) to the number of bits available of the PBCH in 40 ms, which is 1920 bits in case of normal cyclic prefix. Next, segmentation into four equally sized individual self-decodable units is made (indicated by arrows to four boxes). The MIB is sent in 6 RBs, and one such RB is shown at the bottom-most part of FIG. 7.

The inventors behind the present teachings have realized and pinpointed advantages and possibilities in view of lower power modes of communication devices in relation to the described suggestions on reducing power consumption in the network.

Briefly, in an aspect the present teachings provide, in various embodiments, a method performed in a UE. The method comprises the UE detecting that the network has transmission configurations, for instance, signal periods, amount of signals, types of signals, how much resources per signal, etc. that are different from the signals that the UE has previously configured (which could be in another area or in the same area). Upon this detection the UE adapts its DRX parameters, such as for instance On duration, long DRX cycle, short DRX cycle and similar parameters, according to detection of the transmission configurations. It is noted that the DRX configuration possibilities might be different in future access systems than in LTE, i.e. that the DRX parameters may be different and others than the ones explicitly mentioned herein, and the teachings are applicable also to such parameters.

A mechanism is provided for deriving the DRX parameters based on the periodicities with which the network transmits signals that are relevant for the UE to receive or otherwise adapt to. Specific examples of such signals are reference signals and/or system information and/or synchronizations signal which could encode different information such as node identity, beam identity or indexes for system information configuration.

A mechanism to adapt an already configured DRX cycle based on the periodicities with which the network transmits the above mentioned signals is also provided.

Furthermore, the present teachings also provide mechanisms for detecting other relevant properties of signals, e.g. the mentioned signals, such as size of the signals, which signals are being transmitted (in case some are optional), etc. The UE may use also this information to adapt its DRX configuration, for instance the On Duration parameter.

A UE is typically provided with a certain DRX configuration in the RRC_CONNECTED state and paging occasions in RRC_IDLE state, which allows the UE to switch off some of the internal circuitry allowing battery savings during the inactive parts of the cycles. During these "sleep" periods the UE does not perform any measurements and does not receive any data from the network.

When the UE exits the "sleep" period and goes into the active part of a cycle, the UE may perform measurements and the network may transmit data to the UE. If the UE does not receive any downlink message for a period of time when the UE is active outside the "sleep" period, the UE returns to "sleep" for the period of time configured.

It is important that the UE can receive some signals, e.g. reference signals, during the period in which the UE has exited the "sleep" period. This is important so that the UE can perform measurements and keep synchronization with the network. This enables the UE to, for example, perform cell selection or reselection, receive paging indications or receive downlink data, read or update system information, or perform tracking area update.

A network, in particular network nodes thereof, may transmit a different number of signals and/or system information, and can also transmit these signals and/or system information with different periodicities. The decision on the applied period may depend on e.g. how much energy the network aims at saving, on whether there are UEs in an area provided by a network node, the maximum allowed delay and on whether the particular network node is used as an offload node, etc.

In various embodiments, the UEs may be in a state such as RRC_IDLE state in LTE and/or another state optimized for UE power savings such as RRC_CONNECTED Inactive or Dormant state in a future access system. In the description below reference signals are used as an example of the kind of signal which may be used as a main guidance for the UE to adapt its DRX cycle in view of. It is however noted that other signals might also have this role.

As a first exemplary case, the case of the UE not being provided with any DRX configuration is considered. There may be several such instances in which the UE does not have a DRX configuration, because the network has not provided the DRX cycle to be used in a particular cell in which the UE is currently residing. This may, for instance, be due to the network might not be transmitting any system information. As another example, the network might only provide a limited set of system information, and this limited information excludes the DRX cycles.

In such situations, the UE would not have any DRX configuration to be used in that cell. As have been described, it is important to have a DRX cycle in order to allow battery savings and thereby prolong UE operation time. In some embodiments, this situation is addressed by the UE using the last configuration which it had stored.

Figure 8:
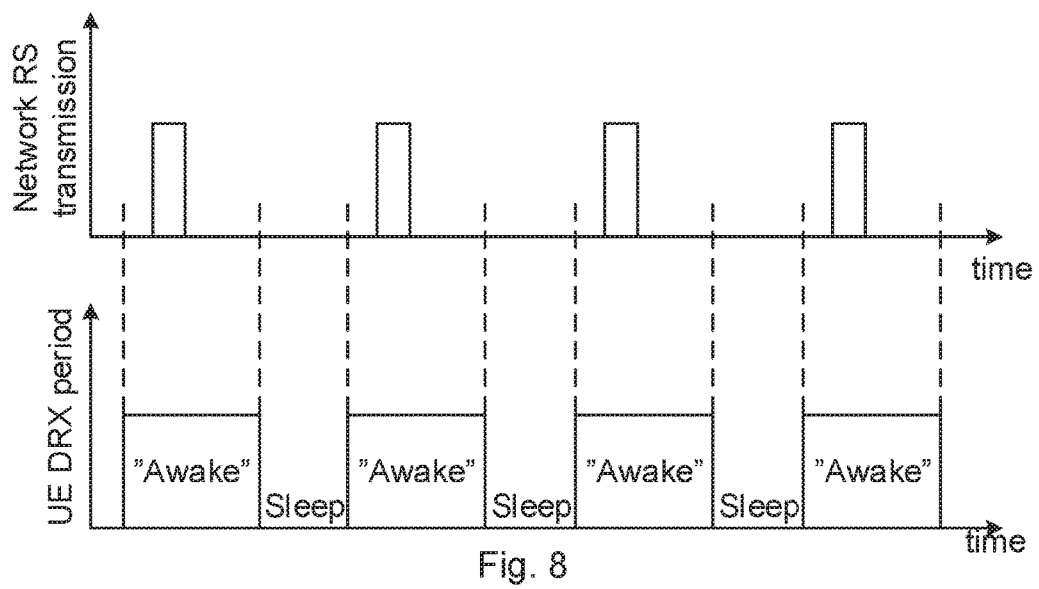
FIG. 8 illustrates an exemplary UE DRX configuration.

FIG. 8 illustrates an exemplary UE DRX configuration. The above mentioned solution to use a stored configuration may introduce other challenges, e.g. that the last configuration is not valid or inability to react to configuration changes in the cell/access node. In other embodiments therefore, the UE determines the periodicity of the signal(s), which allows the UE to be synchronized and perform measurements on reference signals. Based on this period, the UE sets its own DRX cycle and configures the DRX itself. After the UE exits the "sleep" mode (i.e. has entered the "awake period"), the UE may, to allow some flexibility to the network, return to the "sleep" mode after a period of time suitable for the UE to perform a certain number of measurements as well as to allow the network to transmit system information, paging indications or any other data. The UE may exit the sleep period of the DRX cycle before the time the signals will be transmitted according to the network's scheduling.

The above is illustrated in FIG. 8. In the upper graph of FIG. 8, the networks transmissions of reference signals over time are shown. The UE measures on these, and decides with which periodicity a certain signal or signals are transmitted, for example signals needed for synchronization. In the lower graph of FIG. 8, the DRX periods of the UE are shown comprising sleep-periods and "awake"-periods that it has configured itself in accordance with the decided periodicity. As illustrated, the sleep-periods are configured to fall between the network signal transmissions while the awake-periods are configured to fall when the network signal transmissions occur.

When no system information is transmitted, the length of the period in which the UE should be awake could be hardcoded e.g. by specifying an offset time from the reference signal when paging indications or system information (or any other signal or information) may be transmitted from the network.

In addition to determining the awake-period the UE may also decode the actual signals, i.e. the signal types that are being transmitted. The decoding may be beneficial since the types of signals being transmitted may vary, in particular in case some signals are optional. The UE may also need to determine the amount of time and/or frequency resources these signals occupy i.e. defining what would be equivalent to the "on duration" for the new DRX cycle. By establishing type of signal, the UE may deduce the possible periodicities of the corresponding signal e.g. by having pre-configured periodicities of defined signals. Such periodicities may be pre-configured e.g. in a memory of the UE.

As a second exemplary case, the case wherein the UE is indeed provided with a DRX configuration is considered. The UE is thus configured with a DRX cycle. The DRX configuration might have been provided through system information or a reconfiguration message or autonomously by the UE, using the self-learning scheme described above.

A situation that might occur when the UE has a DRX configuration and enters a new area is that e.g. the system information or reference signals in this area are sent with a periodicity that is longer than DRX cycle.

Figure 9:
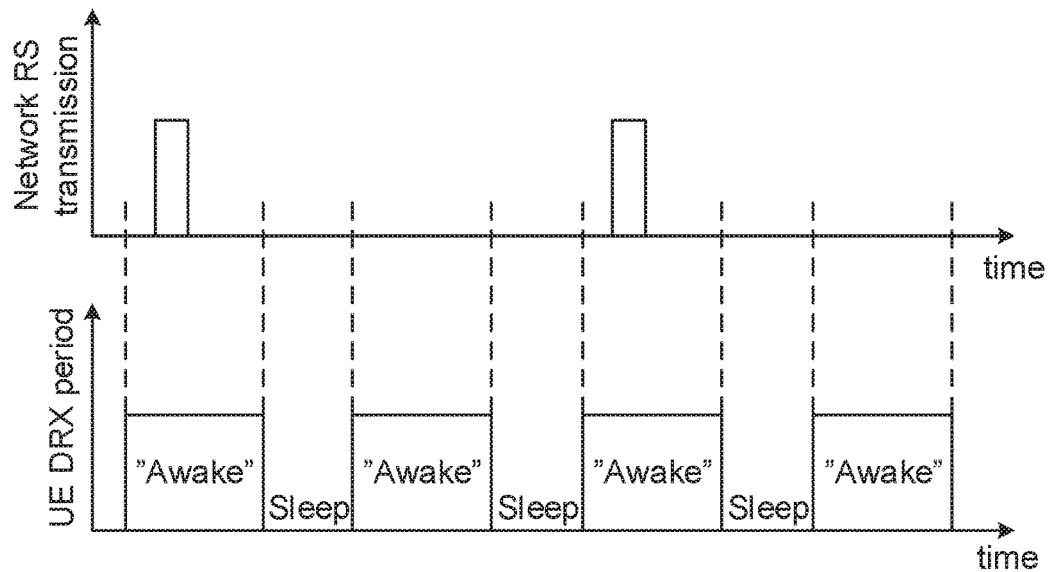
FIG. 9 illustrates an exemplary UE DRX configuration.

FIG. 9 illustrates an exemplary UE DRX configuration. In particular, FIG. 9 illustrates a case in which the UE has been configured with a DRX cycle that is shorter than the period of the reference signals in the cell in which the UE currently resides. It may be assumed that the paging occasions (and any other transmissions such as system information) are scheduled a short period of time after the reference signals, in order to maximize the network power savings.

In the upper graph of FIG. 9, the networks transmissions of reference signals over time are shown. In the lower graph of FIG. 9, the DRX period of the UE is shown, and in particular it's currently configured sleep-periods and "awake"-periods. As illustrated, the sleep-periods are unnecessarily short, as two sleep-periods as well as one awake-period occur between two network transmissions.

In this situation the UE can still determine the periodicity of the reference signals and, if the UE determines that the period between two received network transmissions (of same signal) is longer than the currently used DRX cycle, the UE may adapt its DRX cycle. In the example shown in FIG. 9, the UE would adapt its DRX cycle so as to be in "sleeping" mode in the periods in which no reference signals are scheduled, preferably with some margin after each reference signal transmission in order to allow enough time for the network to transmit any other data, signal or indication, such as system information, in accordance with the above assumption.

Figure 10:
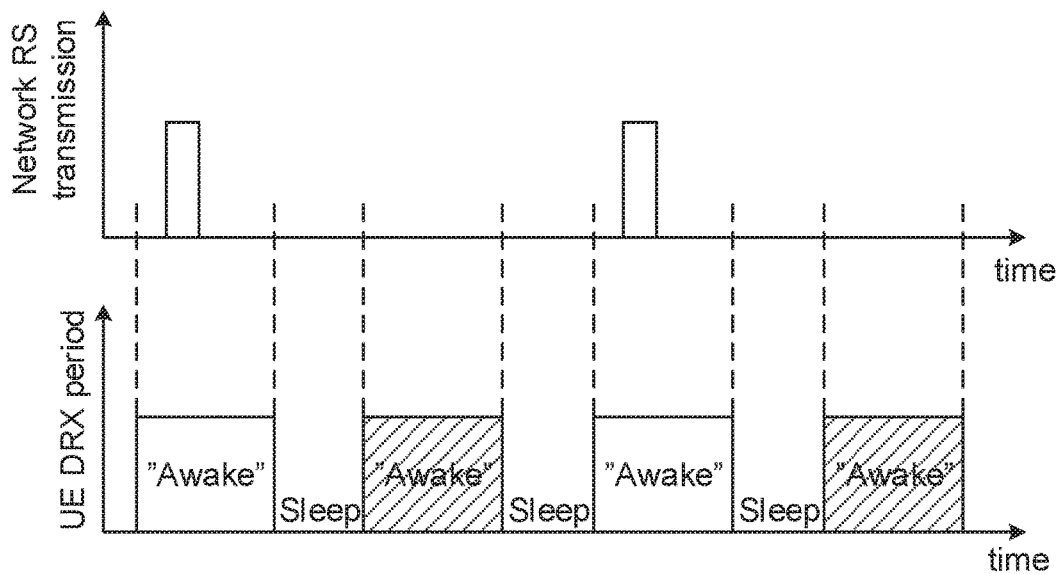
FIG. 10 illustrates an exemplary UE DRX configuration.

FIG. 10 shows the result of such change of the UE DRX configuration. The DRX cycle is adapted to the network transmissions by prolonging the sleep-period. The awake-periods with hatched lines configured initially may be removed and the sleep-period thereby be prolonged. In the awake-periods which were configured earlier, e.g. by the network, the UE decides to continue in sleeping mode.

In other embodiments, the behavior in such situations may be network controlled. The network may indicate to the UE if it is allowed to change the DRX cycle.

In some embodiments, the period of a signal may be comprised in the signal. The UE receiving such signal may then immediately determine suitable DRX parameters without awaiting the next reception of this signal.

In still other embodiments the UE does not rely on detecting the periodicity of transmissions from the network by detecting at least two consecutive transmissions (e.g. reference signals), but can instead derive the period from an indication comprised in the reference signal (or other suitable transmission) or in some payload. The network may indicate the signal periodicity with an indication in the reference signal. For instance, a few bits of the signal may indicate the periodicity, i.e. these bits may be an index pointing out a periodicity in a set of periodicities available in the UE, e.g. in a memory thereof. The set of periodicities may be standardized, but may alternatively be operator/network specific, i.e. loaded in the Universal Subscriber Identity Module (USIM). In other embodiments, the set of periodicities is signaled through system information.

In variations of the above, the reference signal indicates a change in the periodicity rather than the periodicity itself. For instance, one bit in the signal may signify that a new periodicity has been introduced. This bit may be kept for a certain number of consecutive transmissions after a change of periodicity, or some bits may provide a count-down indication prior to a change of periodicity. In still other embodiments, the network may swap between two signals every time a change in the period has occurred. Common for these variations is that the actual period is not indicated, only that it has been or will be changed.

It is noted that various combinations of the described different embodiments may also be implemented, e.g. some bits indicating the period and some bits indicating countdown to change.

Figure 11:
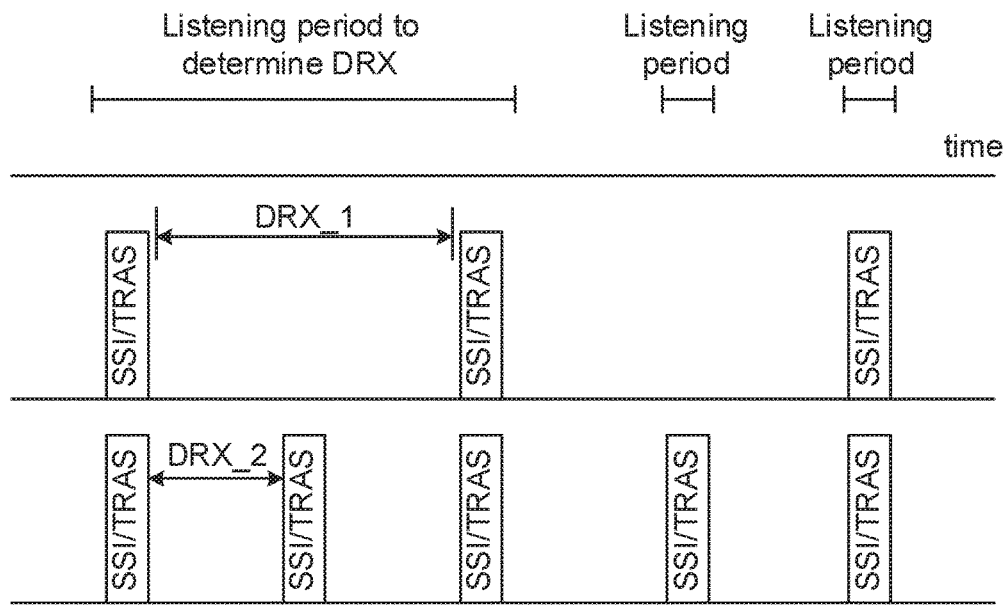
FIG. 11 illustrates an exemplary UE DRX configuration.

FIG. 11 illustrates an exemplary UE DRX configuration, and in particular an embodiment wherein the DRX parameters to be set by the UE is based on multiple signals. The UE may need to monitor multiple signals or it may detect multiple signals, and in contrast to the described embodiments which rely on the period of one certain signal, this embodiment takes several signals into account. The UE may have a listening period to determine suitable DRX parameters as indicated at the upper-most time line of FIG. 11. In the middle-most time line, the UE has detected a first signal and determined the periodicity thereof, and determined a first DRX cycle (DRX_1) based thereon. In the lower-most time line, the UE has detected also a second signal and determined the periodicity thereof, and determined a second DRX cycle (DRX_2) based thereon. The UE may now adapt its current DRX cycle to the shortest period (DRX_2). In other embodiments, the UE may adapt its current DRX cycle to the longest period thereof (DRX_1), for instance if the information that the UE needs from the signal with the shorter periodicity may be obtained in other ways, e.g. from the first signal. Which DRX cycle to select may, in other instances, be dependent on whether fast system access is more important than saving battery power. In such case, the shorter DRX cycle could be used.

Figure 12:
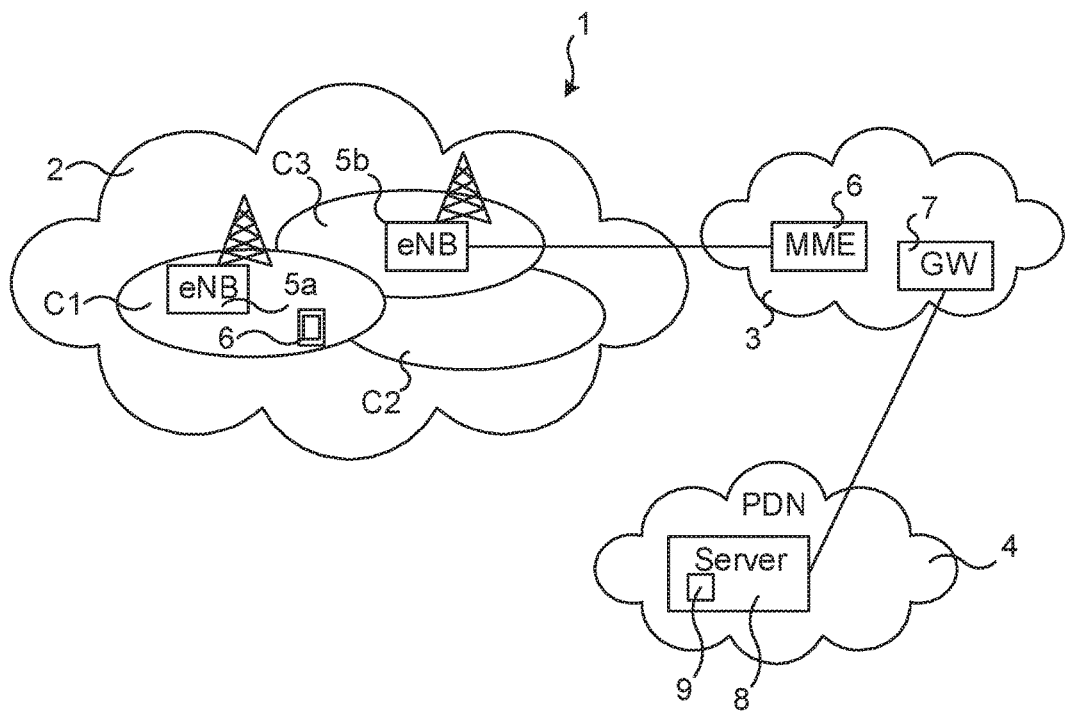
FIG. 12 illustrates schematically an environment in which embodiments according to the present teachings may be implemented.

FIG. 12 illustrates schematically an environment in which embodiments according to the present teachings may be implemented. A communications system 1 is illustrated comprising a radio access network (RAN) 2 and a core network (CN) 3. An external packet data network (PDN) 4 is also illustrated. The RAN 2 may comprise a number of radio access nodes 5a, 5b, which may be denoted differently, e.g. base station, evolved NodeB, or eNB to mention a few examples. The radio access node 5a, 5b provides wireless communication for communication devices 6 residing within its coverage area C1, C2, C3 over a radio interface, e.g. Um interface. In this context it is noted that one such radio access node 5a, 5b may control several geographical areas, e.g. cells or sectors.

The CN 3 may comprise various network nodes, which may also be denoted differently depending on the particular communications system at hand. In LTE, for instance, the CN 3 may comprise entities such as a Mobility Management Entity (MME) and packet data network gateways (PDN GW) providing connectivity to e.g. the PDN 3.

The communications system 1 may comprise or be connectable to the PDN 4, which in turn may comprise a server 8 or cluster of servers, e.g. a server of the Internet ("webserver") or any application server. Such server 8 may run applications 9. It is noted that some embodiments of the present teachings may be implemented in a distributed manner, locally and/or in a centralized component (e.g. in a so called cloud environment).

The various features and embodiments that have been described may be combined in many different ways, examples of which are given in the following with reference first to FIG. 13.

Figure 13:
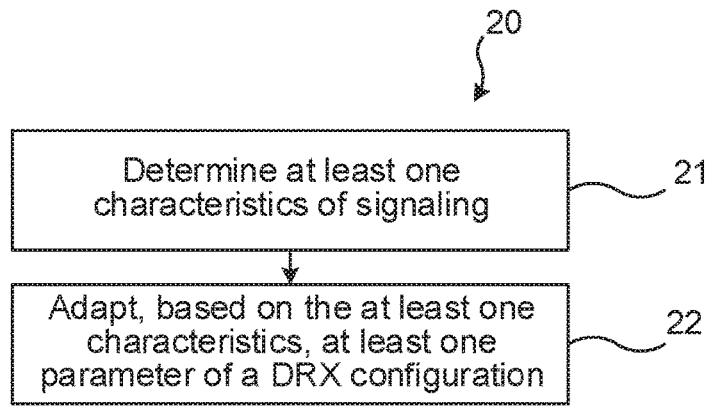
FIG. 13 illustrates a flow chart over steps of an embodiment of a method in a communication device in accordance with the present teachings.

FIG. 13 illustrates a flow chart over steps of an embodiment of a method in a communication device in accordance with the present teachings. A method 20 is provided that may be performed in a communication device 6 for establishing a discontinuous reception mode configuration. The method 20 comprises determining 21 at least one characteristics of signaling from a network node 5a, 5b. The method 20 comprises adapting 22, based on the at least one characteristics, at least one parameter of a currently used discontinuous reception mode configuration.

The method 20 enables the communication device 6 to autonomously decide on which DRX configuration parameters to use based on network transmissions. The operation time of the communication device 6 may be improved by such adaptation to current signaling in the network, since the DRX configuration enabling the longest possible sleep-period can be set. Further, the delay for the communication device 6 to obtain system access can also be minimized. Still further, the network operator may develop energy savings in different ways, e.g. according to the currently suggested ways described earlier. Any such reduced signaling to meet the real usage in the cell, recalling for instance Scenarios 1-3 described with reference to FIG. 1, can be made without risking reduced user satisfaction e.g. in view of system access delay on account of the communication device being in sleeping mode when entering a new area with new signal periodicities.

In an embodiment, the determining 21 the at least one characteristics comprises determining that a signal configuration of a received signal differs from the currently used signal configuration for the type of signal received. In this embodiment, the communication device 6 indeed detects the signal and can determine the at least one characteristics based thereon. In other embodiments, the determining 21 comprises determining the at least one characteristics based on failure to detect an expected signal. The communication device 6 may have evaluated the periodicity of a signal and configured its DRX cycle accordingly. The communication device 6 may then open its receiver in the configured awake-period in order to perform measurement and fail to detect the expected signal. This failure could, for instance, be due to the network having changed the periodicity of the signal. In such case, the communication device 6 is able to determine the at least one characteristics e.g. by extending its awake-period until it finds the expected signal and then set the DRX configuration accordingly.

In some embodiments, the determining 21 comprises receiving a signal at least twice and determining a periodicity thereof, and the adapting 22 comprises adapting, based on the periodicity, the at least one parameter.

In various embodiments, the determining the one or more parameters comprises determining a duration of a sleep period by determining a periodicity of a received signal to be mismatched with the duration of a currently used sleep period, the mismatch comprising the sleep period overlapping a reception time of the signal or the sleep period being at least a threshold value shorter than the determined period, and adapting the sleep period of the discontinuous reception mode by prolonging, shortening or synchronizing the duration thereof in view of the determined period. The communication device 6 may thus adapt its sleep period to best suit the current signaling, i.e. so that the sleep period is as long as possible but without risking to miss any necessary signaling from the network.

In various embodiments, the adapting comprises adapting the parameter based on information received in a signal, the information comprising periodicity of the received signal. The received signal itself may hence comprise the periodicity, whereby the communication device 6 is immediately in position to determine the DRX parameters.

In various embodiments, the method 20 is performed following reception of an indication from the network node 5a, 5b, the indication indicating allowance of autonomous configuration of discontinuous reception mode. Such embodiments gives more control to the network operator, by giving the option to prevent communication devices 6 from setting their own DRX parameters.

In various embodiments, the characteristics of the received signaling comprise one or more of: periodicity of a signal, type of signal, length of a signal, bandwidth of a signal, subcarrier used by a signal, sub-cycles in an overall period of a signal, gaps in transmission of a signal, and a scrambling code of a signal.

In various embodiments, the method 20 comprises reporting, to a network node 5a, 5b, the established discontinuous reception mode configuration.

In various embodiments, the one or more parameters of the discontinuous reception mode configuration comprises one or more of: settings of an inactivity timer, settings of a cycle timer, settings of a long cycle timer, settings of a short cycle timer, settings of a sub-cycle timer, settings of a cycle offset, settings of a wakeup timer, settings of a short cycle inactivity timer, settings of an on-duration timer, settings of a long cycle inactivity timer, settings of a paging cycle.

In various embodiments, the signaling comprises one or more system information signals or one or more reference signals.

Figure 14:
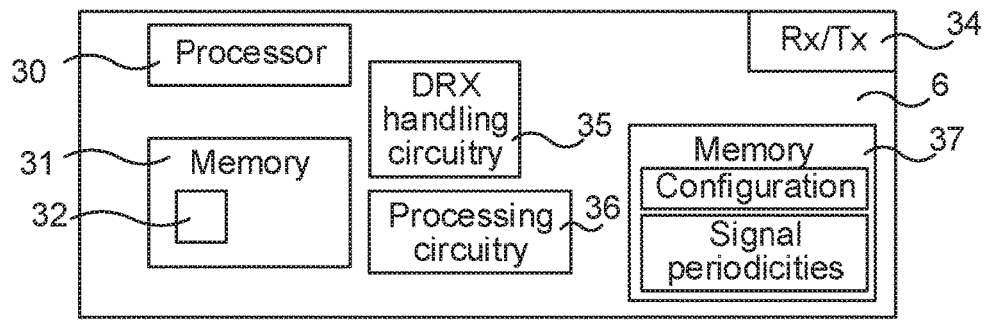
FIG. 14 illustrates schematically a communication device and means for implementing embodiments in accordance with the present teachings.

FIG. 14 illustrates schematically a communication device 6 and means for implementing embodiments in accordance with the present teachings.

The communication device 6 comprises a processor 30 comprising any combination of one or more of a central processing unit (CPU), multiprocessor, microcontroller, digital signal processor (DSP), application specific integrated circuit etc. capable of executing software instructions stored in a memory 31, which can thus be a computer program product 31. The processor 30 can be configured to execute any of the various embodiments of the method 20 for instance as described in relation to FIG. 13.

The memory 31 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory. A data memory (not explicitly illustrated) may also be provided for reading and/or storing data during execution of software instructions in the processor 30.

The communication device 6 may also comprise transceiving circuitry 34, indicated by Rx/Tx in FIG. 13. The transceiving circuitry 34 may comprise various circuitry and devices for communication exchange for instance with network nodes 5a, 5b, or other entities of the communications system 1. For instance, the transceiving circuitry 34 may comprise software and/or hardware for reception, transmission, modulation, demodulation etc.

The communication device 6 may also comprise circuitry 35 for handling the DRX configuring as have been described.

The communication device 6 may also comprise a memory 37 for storing pre-configurations, e.g. sets of signal periodicities from which it may retrieve a certain signal periodicity based on an indication it has received in a signal.

The communication device 6 may also comprise additional processing circuitry, schematically indicated at reference numeral 36. Such additional processing circuitry may be used for implementing the various embodiments that have been described.

The communication device 6 is configured to perform any of the embodiments of the method 20 that has been described e.g. with reference to FIG. 13. The communication device 6 may be configured to perform the steps of the described embodiments e.g. by comprising a processor 30 and memory 31, the memory 31 containing instructions executable by the processor 30, whereby the communication device 6 is operative to perform the steps.

A communication device 6 for establishing a discontinuous reception mode configuration is provided. The communication device 6 is configured to:

determine at least one characteristics of signaling from a network node, and adapt, based on the at least one characteristics, at least one parameter of a currently used discontinuous reception mode configuration.

In an embodiment, the communication device 6 is configured to determine the at least one characteristics by determining that a signal configuration of a received signal differs from the currently used signal configuration for the type of signal received.

In some embodiments, the communication device 6 is configured to determine by receiving a signal at least twice and determining a periodicity thereof, and configured to adapt by adapting, based on the periodicity, the at least one parameter.

In some embodiments, the communication device 6 is configured to determine the one or more parameters by determining a duration of a sleep period by:

determining a periodicity of a received signal to be mismatched with the duration of a currently used sleep period, the mismatch comprising the sleep period overlapping a reception time of the signal or the sleep period being at least a threshold value shorter than the determined period, and adapting the sleep period of the discontinuous reception mode by prolonging, shortening or synchronizing the duration thereof in view of the determined period.

In some embodiments, the communication device 6 is configured to determine the at least one characteristics based on failure to detect an expected signal.

In some embodiments, the communication device 6 is configured to adapt by adapting the parameter based on information received in a signal, the information comprising periodicity of the received signal.

In some embodiments, the communication device 6 is configured to determine and to adapt following reception of an indication from the network node 5a, 5b, the indication indicating allowance of autonomous configuration of discontinuous reception mode.

In various embodiments, the characteristics of the received signaling comprise one or more of: periodicity of a signal, type of signal, length of a signal, bandwidth of a signal, subcarrier used by a signal, sub-cycles in an overall period of a signal, gaps in transmission of a signal, and a scrambling code of a signal.

In some embodiments, the communication device 6 is configured to report, to a network node 5a, 5b, the established discontinuous reception mode configuration.

In various embodiments, the one or more parameters of the discontinuous reception mode configuration comprises one or more of: settings of an inactivity timer, settings of a cycle timer, settings of a long cycle timer, settings of a short cycle timer, settings of a sub-cycle timer, settings of a cycle offset, settings of a wakeup timer, settings of a short cycle inactivity timer, settings of an on-duration timer, settings of a long cycle inactivity timer, settings of a paging cycle.

In various embodiments, the signaling comprises one or more system information signals or one or more reference signals.

The present teachings also provide a computer program 32 for a communication device 6 for establishing a discontinuous reception mode configuration. The computer program 32 comprises computer program code, which, when executed on at least one processor on the communication device 6 causes the communication device 6 to perform the method 20 as has been described.

A computer program product 31 comprising a computer program 32 as described above and a computer readable means on which the computer program 32 is stored is also provided.

The computer program product, or the memory, thus comprises instructions executable by the processor 30. Such instructions may be comprised in a computer program, or in one or more software modules or function modules.

Figure 15:
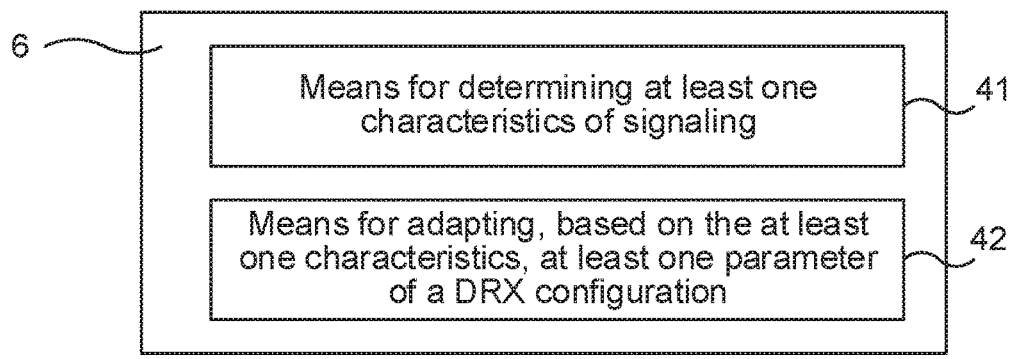
FIG. 15 illustrates a communication device comprising function modules/software modules for implementing embodiments of the present teachings.

FIG. 15 illustrates a communication device 6 comprising means for implementing embodiments of the present teachings. The means, e.g. function modules, e.g. function modules, can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the methods that have been described.

A communication device 6 is provided for establishing a discontinuous reception mode configuration. The communication device 6 comprises first means 41 for determining at least one characteristics of signaling from a network node. The first means may comprise processing circuitry adapted to perform such determination.

The communication device 6 comprises second means 42 for adapting, based on the at least one characteristics, at least one parameter of a currently used discontinuous reception mode configuration. The second means may comprise processing circuitry adapted to perform such parameter adaptation.

The communication device 6 may comprise still further means for implementing the various embodiments of the method 20 that have been described.

The communication device 6 is configured to perform any of the embodiments of the method 20 that has been described e.g. with reference to FIG. 13. The communication device 6 may be configured to perform the steps of the described embodiments e.g. by comprising a processor 30 and memory 31, the memory 31 containing instructions executable by the processor 30, whereby the communication device 6 is operative to perform the steps.

A communication device is provided for establishing a discontinuous reception mode configuration. The communication device comprises a processor and a memory, the memory containing instructions executable by the processor, whereby the communication device is operative to:

determine at least one characteristics of signaling from a network node, and adapt, based on the at least one characteristics, at least one parameter of a currently used discontinuous reception mode configuration.

The memory may, as mentioned earlier, comprise instructions executable by the processor for performing any of the described embodiments.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a communication device for establishing a discontinuous reception mode configuration, the method comprising:

determining at least one characteristic of reference signaling, system information signaling, or synchronization signaling from a network node, and adapting, based on the at least one characteristic, at least one parameter of a currently used discontinuous reception mode configuration, wherein the adapting comprises determining a duration of a sleep period by:

determining a periodicity of a received signal to be mismatched with a duration of a currently used sleep period, the mismatch comprising the sleep period overlapping a reception time of the received signal or the sleep period being at least a threshold value shorter than the determined duration of the sleep period, and adapting the sleep period of the discontinuous reception mode by prolonging, shortening, or synchronizing the duration thereof in view of the determined duration of the sleep period.

2. The method as claimed in claim 1, wherein determining the at least one characteristic comprises determining that a signal configuration of the received signal differs from a currently used signal configuration for a type of the received signal.

3. The method as claimed in claim 1, wherein the determining comprises receiving a signal at least twice and determining a periodicity thereof, and wherein the adapting comprises adapting, based on the periodicity, the at least one parameter.

4. The method as claimed in claim 1, wherein the determining comprises determining the at least one characteristic based on failure to detect an expected signal.

5. The method as claimed in claim 1, wherein the adapting comprises adapting the at least one parameter based on information received in a signal, the information comprising the periodicity of the received signal.

6. The method as claimed in claim 1, wherein the method is performed following reception of an indication from the network node, the indication indicating allowance of autonomous configuration of discontinuous reception mode.

7. The method as claimed in claim 1, wherein the at least one characteristic of the received signal comprises one or more of: periodicity of a signal, type of signal, length of a signal, bandwidth of a signal, subcarrier used by a signal, sub-cycles in an overall period of a signal, gaps in transmission of a signal, and a scrambling code of a signal.

8. The method as claimed in claim 1, comprising reporting, to the network node, the established discontinuous reception mode configuration.

9. The method as claimed in claim 1, wherein the at least one parameter of the currently used discontinuous reception mode configuration comprises one or more of: settings of an inactivity timer, settings of a cycle timer, settings of a long cycle timer, settings of a short cycle timer, settings of a sub-cycle timer, settings of a cycle offset, settings of a wakeup timer, settings of a short cycle inactivity timer, settings of an on-duration timer, settings of a long cycle inactivity timer, settings of a paging cycle.

10. The method as claimed in claim 1, wherein a signaling among the reference signaling, the system information signaling, or the synchronization signaling comprises one or more system information signals or one or more reference signals.

11. A communication device for establishing a discontinuous reception mode configuration, the communication device comprising:
a processor; and
memory for storing instructions executable by the processor, whereby the communications device is configured to:
determine at least one characteristic of reference signaling, system information signaling, or synchronization signaling from a network node,
adapt, based on the at least one characteristic, at least one parameter of a currently used discontinuous reception mode configuration, and
adapt the at least one parameter by determining a duration of a sleep period by:
determining a periodicity of a received signal to be mismatched with a duration of a currently used sleep period, the mismatch comprising the sleep period overlapping a reception time of the received signal or the sleep period being at least a threshold value shorter than the determined duration of the sleep period, and
adapting the sleep period of the discontinuous reception mode by prolonging, shortening, or synchronizing the duration thereof in view of the determined duration of the sleep period.

12. The communication device as claimed in claim 11, configured to determine the at least one characteristic by determining that a signal configuration of the received signal differs from a currently used signal configuration for a type of the received signal.

13. The communication device as claimed in claim 11, configured to determine by receiving a signal at least twice and determining a periodicity thereof, and configured to adapt by adapting, based on the periodicity, the at least one parameter.

14. The communication device as claimed in claim 11, configured to determine the at least one characteristic based on failure to detect an expected signal.

15. The communication device as claimed in claim 11, configured to adapt by adapting the at least one parameter based on information received in a signal, the information comprising the periodicity of the received signal.

16. The communication device as claimed in claim 11, configured to determine and to adapt following reception of an indication from the network node, the indication indicating allowance of autonomous configuration of discontinuous reception mode.

17. The communication device as claimed in claim 11, wherein the at least one characteristic of the received signal comprises one or more of: periodicity of a signal, type of signal, length of a signal, bandwidth of a signal, subcarrier used by a signal, sub-cycles in an overall period of a signal, gaps in transmission of a signal, and a scrambling code of a signal.

18. The communication device as claimed in claim 11, configured to report, to the network node, the established discontinuous reception mode configuration.

19. The communication device as claimed in claim 11, wherein the at least one parameter of the currently used discontinuous reception mode configuration comprises one or more of: settings of an inactivity timer, settings of a cycle timer, settings of a long cycle timer, settings of a short cycle timer, settings of a sub-cycle timer, settings of a cycle offset, settings of a wakeup timer, settings of a short cycle inactivity timer, settings of an on-duration timer, settings of a long cycle inactivity timer, settings of a paging cycle.

20. The communication device as claimed in claim 11, wherein a signaling among the reference signaling, the system information signaling, or the synchronization signaling comprises one or more system information signals or one or more reference signals.

* * * * *